United States Patent [19]
Chapman

[11] Patent Number: 5,128,860
[45] Date of Patent: Jul. 7, 1992

[54] MANUFACTURING OR SERVICE SYSTEM ALLOCATING RESOURCES TO ASSOCIATED DEMANDS BY COMPARING TIME ORDERED ARRAYS OF DATA

[75] Inventor: William Chapman, Scottsdale, Ariz.

[73] Assignee: Motorola, Inc., Schaumburg, Ill.

[21] Appl. No.: 342,774

[22] Filed: Apr. 25, 1989

[51] Int. Cl.$^5$ .............................................. G06F 15/21
[52] U.S. Cl. ..................................... 364/401; 364/408
[58] Field of Search ...................... 364/419, 401, 408; 400/63, 76

[56] References Cited

U.S. PATENT DOCUMENTS

| | | |
|---|---|---|
| 3,703,725 | 11/1972 | Gomersell et al. |
| 3,845,286 | 10/1974 | Aronstein et al. |
| 4,208,712 | 1/1980 | Deutsch |
| 4,517,637 | 5/1985 | Cassell |
| 4,591,983 | 5/1986 | Bennett et al. |
| 4,628,434 | 12/1986 | Tashiro et al. |
| 4,628,435 | 12/1986 | Tashiro et al. |
| 4,635,182 | 1/1987 | Hintz |
| 4,658,320 | 4/1987 | Hongel |
| 4,670,848 | 6/1987 | Schramm |
| 4,697,242 | 9/1987 | Holland et al. |

Primary Examiner—Gail O. Hayes
Attorney, Agent, or Firm—Eugene A. Parsons; Robert M. Handy

[57] ABSTRACT

An improved method and system is described for allocating manufacturing or process resources having multiple constraints thereon to meet various time varying manufacturing or service demands having multiple parameter requirements.

The demand requirements are expressed as a multi-dimensional time ordered array of vertices $D_q[t,r,j]$, for each demand q, wherein t is time and r identifies the physical requirements associated with the $q^{th}$ demand and j is an integer index running from 1 to J wherein J is the total number of times wherein r has differing values. The available resources are expressed as a multi-dimensional time ordered array of resource vertices $R_p[t,c,i]$ for each resource p, where c expresses the physical capacities associted with the $p^{th}$ resource, t is time and i is an integer index running from 1 to I where I is the total number of times wherein c has differing values.

A logical system is provided for comparing $R_p$ and $D_q$ to determine when and how $D_q$ may be accommodated by $R_p$. The invented arrangement provides very compact representation of the demand and resource information so that very complex processes and products may be modeled and scheduled with great time precision without requiring large amounts of memory. The invented arrangement can provide scheduling accuracy of one second over a scheduling interval of a century even with a modest size computer.

7 Claims, 4 Drawing Sheets

MANUFACTURING OR SERVICE SYSTEM ALLOCATING RESOURCES TO ASSOCIATED DEMANDS BY COMPARING TIME ORDERED ARRAYS OF DATA

BACKGROUND OF THE INVENTION

1. Field of the Invention

This invention relates in general to means and methods for allocating resources to satisfy a time varying demand on those resources and, more particularly, to improved means and methods for allocating manufacturing or process resources having multiple constraints thereon to meet various time varying manufacturing or service demands having multiple manufacturing or service parameter requirements.

2. Background Art

There is an ongoing requirement in commerce and industry to achieve the best possible usage of manufacturing or other resources, e.g., production machines, computers transportation systems, controllers, testers, labor, etc., consistent with the volume, characteristics and quality of products or services desired to be produced using those resources. Frequently, a particular product or service which is desired to be obtained may need many sequential or parallel steps that must be performed using the various resources. The particular steps or parameters of those steps may vary with different products or services and/or during different stages of the assembly or handling process.

At the same time, the resources intended to be used to make the products or provide the services have certain inherent capacity. For example, the quantity that can be produced or handled per unit time on a particular machine or or by particular workers or at a particular stage of the process may be fixed by physical constraints on the machine or workers or process stage; or a given production machine or stage may only be capable of reaching certain temperatures or lifting certain weight or only have available only certain atmospheres or chemicals or voltages or currents; or a given resource may only be capable of carrying out particular steps or providing a particular sequence of steps. Those of skill in the art will appreciate that these are only examples of the many physical constraints that may be associated with individual production or process resources. As used herein, the words "capacity" or "capacities" are intended to refer collectively to the many limitations or constraints which determine the ability of a resource to respond to a demand.

Similarly, the product or service desired will require that certain physical steps or other conditions be provided. For example, a certain quantity of the product must be made; or at certain stages of the process various materials must be subjected to certain temperatures, voltages, forming operations and/or atmospheres; or certain ingredients or information must be added. Collectively, these demand requirements define what it takes to obtain the desired product or service.

The problem faced by those managing the resources, is to balance in the most desirable way, the demand on the resources against the availability of the resources, taking into account all of the complex details and interactions that are part of real world production or processes. This activity is generally referred to as "scheduling" or "production control" and has existed for many years. An important and especially complex part of this activity, is determining how new or modified demands may be optimally accommodated in a manufacturing or service process which is already partially loaded by previously scheduled demands. Many possible options may exist for accommodating the new or modified demands. Also, resource availability is changing in real time as the previously scheduled production lots or materials or service recipients continue to advance through the process.

Historically, scheduling has been done by the use of what is referred to in the art as "time buckets", that is, using fixed unit increments of time wherein a given resource, e.g., a particular production resource, is assigned an availability value. For example, a large chart is made on which the production resources are listed, e.g., along the left margin and usually in the order intended to be used. Running across the top are the unit time increments, for example, hours, days or weeks. The intersections of the resource rows and the time columns are the "time buckets". When a resource is committed to perform a particular step for a particular duration, the corresponding number of time buckets are filled in or marked in some fashion. The start time, stop time and duration are indicated by where on the chart and how many of the time buckets are filled in. Often, the amount of a resource committed to a particular production lot and/or the amount remaining that might be assigned to another production lot or both are recorded. In a typical, sequential, time bucket scheduling chart, the track of an individual batch or production lot appears as a staggered series of entries extending from upper left toward lower right.

When a new or modified demand is presented to the production scheduler, he scans the board looking for time buckets which have unused capacity and which match the other demand requirements. If he finds a sufficient number of available time buckets with sufficient unused capacity, he enters the next production lot into the schedule. Various marking or identification schemes have been used in the past to record this information and computer programs have been written for many general purpose computers that attempt to keep track of this time bucket allocation procedure.

A major difficulty with these and other prior art scheduling approaches is that they become extremely unwieldy and time consuming when the number of constraints on the manufacturing resources and/or the number of demand requirements needed by the desired products or services rises. Very large charts and/or data matrices are needed. Even though powerful (and expensive) computers are employed to maintain the time bucket allocation data and receive the input demand requirements, inordinately long times are required with prior art approaches to achieve optimal balancing of resources against demand. It has not been possible to achieve real-time demand-resource allocation solutions for complex manufacturing or process resources faced with complex product or service demands. One of the reasons for this is the very large amount of data required to be recorded and manipulated by prior art approaches.

Accordingly, it is a object of the present invention to provide an improved means and method for comparing resource availability versus demand requirements for better resource scheduling.

It is a further object of the present invention to provide an improved means and method for resource and demand identification, coding and reconciliation which requires less memory and computing resources than in the prior art and/or, which can be accomplished in less time.

It is an additional object of the present invention to provide an improved means and method for resource and demand identification, coding and reconciliation which can provide more accurate information output than has been previously available.

The words "scheduling interval" are used herein to denoted a period of time extending into the future during which it is desired to be able to schedule resources. In general, the longer the production or service cycle time the longer the scheduling interval. Scheduling intervals of weeks, months and years are common. In some rare cases which involve very long process cycles, schedules can extend over one or more decades.

The words "process" or "processes" are used herein to refer generally to the steps by which one or more resources operate on various input materials to change their physical state to provide a product or service that satisfies the demand. The symbol "c" is used herein to denote capacity or capacities associated with resources, i.e., what amounts and/or properties of the resources are available. The symbol "r" is used herein to denote physical requirements on various resources associated with various demands, i.e., what amounts and/or properties of the resources are needed to meed the demand.

Those of skill in the art will appreciate that both "c" and "r" are usually multi-dimensional. For example, a resource may have simultaneous capacities "c" for achievable lifting range, work rate, decision making ability, materials handled, forming ability, computation ability, temperature, voltage and current range capability, chemicals dispensed, impurities excluded or provided, input/output configurations, and so forth. Similarly, a desired product or service may have simultaneous demand requirements "r" for values of these or other capacity attributes which must be provided. Further, those of skill in the art will understand that both c and r can change with time and that the process for satisfying the demand may be sequential, parallel or a combination thereof.

As used herein, the expressions "$</=$", "$>/=$" and "$=/=$" are intended to indicate "less than or equal to", "greater than or equal to", and "not equal to", respectively.

SUMMARY OF THE INVENTION

The attainment of the foregoing and other objects and advantages is achieved though the present invention wherein there is provided a process for allocating resources to alter the physical state of predetermined input materials to meet a predetermined production or service demand, comprising:

converting the demands into an array of physical resource capacity requirements for each resource which is ordered in time and has entries only for time values when the required capacities change;

providing for each resource an array of available capacities which is ordered in time and has entries only for time values when the available capacities change;

comparing the time ordered arrays of required and available capacities to determine whether and when the available capacities equal or exceed the required capacities and, when successful, modifying the time ordered array of available capacities to provide an up-dated time ordered array of available capacities reflecting the assignment of available capacities to meet the requirements associated with the demands, wherein the up-dated time ordered array of available capacities only has entries when the up-dated available capacities change; and applying the resource required first in time to the input materials to change the physical state thereof.

In a preferred embodiment, this is accomplished by a process comprising:

identifying the demands for altering the physical state of the predetermined input materials;

identifying one or more quantifiable physical requirements r associated with the $q^{th}$ physical demand, relevant to altering the physical state of the input materials;

identifying the resources needed to provide the desired alteration of the physical state of the predetermined input materials;

identifying one or more quantifiable physical capacities c associated with the $p^{th}$ physical resource, relevant to altering the physical state of the input materials;

providing an orderable array of multidimensional demand vertices $D_q[t,r,j]$ for the demand d, wherein t is time, r identifies the physical requirements associated with the $q^{th}$ demand, and j is an integer index running from 1 to J wherein J is the total number of times wherein r has differing values;

ordering the array of multidimensional vertices $D_q[t,r,j]$ for increasing values of t, wherein each value of j corresponds to a value of t where r changes value;

storing the ordered values of $D_q[t,r,j]$ corresponding to each value of j;

providing an orderable array of multidimensional resource vertices $R_p[t,c,i]$ for the resource p, wherein t is time, c identifies the physical capacities associated with the $p^{th}$ resource, and i is an integer index running from 1 to I wherein I is the total number of times wherein c has differing values;

ordering the array of multidimensional vertices $R_p[t,c,i]$ for increasing values of t, wherein each value of i corresponds to a value of t where c changes value;

storing the ordered values of $R_p[t,c,i]$ corresponding to each value of i;

comparing $R_p$ and $D_q$ to determine the values i' and i" of i between which $c>/=r$, $t(i')</=t(j=1)$ and $t(i'')>/=t(j=2)$, and decrementing the values of c in $R_p[t,c,i]$ for i $=(i'+1)$ to $(i''-1)$ by $r(j=1)$, and if $t(i')=t(j=1)$ replacing c in the value of $R_p[t,c,i']$ by $c=c(i')-r(j=1)$, or if $t(i')<t(j=1)$ inserting a first new value $R+_p$ in the ordered array of vertices $R_p$ at $t(i'-)<t</=t(j=1)$, wherein the first newly inserted value $R+_p$ has $c=c(i')-r(j=1)$, and if $t(i'')=t(j=2)$ leaving the value of $R_p[t,c,i'']$ unaltered, or if $t(i'')>t(j=2)$ inserting a further new value $R++_p$ in the ordered array of vertices $R_p$ at $t(j=2)</=t<t(i'')$, wherein the further newly inserted value $R++_p$ has $c=c(i''-1)+r(j=1)$, and increasing I by the number of newly inserted values of $R_p$; and changing the physical state of the input material by applying the $p^{th}$ resource to the input material of the $q^{th}$ demand at a beginning time $t_b$ of $t(i')</=t_b</=t(j=1)$ until an ending time $t_e$ of $t(j=2)</=t_e</=t(i'')$.

The above described process is desirably repeated for each value of j and for each resource p and demand q until a series of beginning and ending times is obtained for completing the entire desired manufacturing or service sequence on all of the needed resources. The above described resource allocation process also yields an updated ordered array of resource vertices $R_p$ incorporating the newly accommodated demand. This forms the starting vertex array for considering further demand.

In a further embodiment, the comparing step is modified to determine the first available values i* and i** and corresponding times t(i*) and t(i**) when $c >/= r$ for a time interval $dt = t(j=2) - t(j=1)$, and then setting $t(j=1) = t(i^*)$ and $t(j=2) = t(i^*) + dt$. This is useful in the situation where the starting time is not limited by some preceding step constraining when the lot is available to start processing on the $p^{th}$ resource. If the lot is ready to start but scheduling is constrained by the availability of a $p^{th}$ resource, then this embodiment provides the first available starting time when the $p^{th}$ resource has available capacities c which meet all of the demand requirements r.

In a still further embodiment, the comparing step is modified to determine the first available combination of a predetermined number of i value pairs $i_a, i_b, i_c, i_d, i_n, i_m$ corresponding to time intervals $dt_1, dt_2, ... dt_n$, wherein $dt_1 + dt_2 + ... dt_n >/= dt$. This is useful where the steps performed by the $p^{th}$ resource need not be continuous in time, and is especially helpful in maximizing resource usage.

If the foregoing process results in any pre-existing changes in c being eliminated, then the vertices associated with these eliminated changes are deleted, the vertex array re-ordered to reflect the deletions and the value of $I = i_{max}$ correspondingly adjusted.

The above-described process provides a particularly compact data matrix so that large numbers of resource capacities and demand requirements can be quickly evaluated to obtain more effective resource utilization.

A physical resource management system for carrying out the above-described process which attains the foregoing and other objectives is also provided, comprising:

means for converting the demands into an array of physical resource capacity requirements for each resource which is ordered in time and has entries only for time values when the required capacities change;

means for providing for each resource an array of available capacities which is ordered in time and has entries only for time values when the available capacities change; and means for comparing the time ordered arrays of required and available capacities to determine whether and when the available capacities equal or exceed the required capacities and, when successful, modifying the time ordered array of available capacities to provide an up-dated time ordered array of available capacities reflecting the assignment of available capacities to meet the requirements associated with the demands, wherein the up-dated time ordered array of available capacities only has entries when the up-dated available capacities change.

The above described system desirably also includes means for applying the resource required first in time to the input materials to change the physical state thereof and/or means for receiving feedback from one or more resources as to their availability status.

In a preferred embodiment, the above-described system comprises:

means for receiving a description of one or more quantifiable physical requirements r associated with the $q^{th}$ physical demand relevant to altering the physical state of the input materials, and for forming an array of multidimensional demand vertices $D_q[t,r,j]$ for the demand q, wherein t is time and j is an integer index running from 1 to J wherein J is the total number of times wherein r has differing values, and for receiving a description of one or more quantifiable physical capacities c associated with the $p^{th}$ physical resource relevant to altering the physical state of the input materials, and for forming an array of multidimensional resource vertices $R_p[t,c,i]$ for the resource p, wherein t is time and i is an integer index running from 1 to I wherein I is the total number of times wherein c has differing values;

means for ordering the array of multidimensional vertices $D_q[t,r,j]$ for increasing values of t, wherein each value of j corresponds to a value of t where r changes value, and for ordering the array of multidimensional vertices $R_p[t,c,i]$ for increasing values of t, wherein each value of i corresponds to a value of t where c changes value;

means for storing the ordered values of $D_q[t,r,j]$ corresponding to each value of j and for storing the ordered values of $R_p[t,c,i]$ corresponding to each value of i;

means for comparing $R_p$ and $D_q$ to determine the values i' and i'' of i between which $c >/= r$, $t(i'-)</= t(j=1)$ and $t(i'') >/= t(j=2)$, and decrementing the values of c in $R_p[t,c,i]$ for $i = (i'+1)$ to $(i''-1)$ by $r(j=1)$, and if $t(i') = t(j=1)$, replacing c in the value of $R_p[t,c,i']$ by $c = c(i') - r(j=1)$, or if $t(i') < t(j=1)$, inserting a first new value $R+_p$ in the ordered array of vertices $R_p$ at $t(i') < t </= t(j=1)$, wherein the first newly inserted value $R+_p$ has $c = c(i') - r(j=1)$, and if $t(i'') = t(j=2)$, leaving the value of $R_p[t,c,i'']$ unaltered, or if $t(i'') > t(j=2)$, inserting a further new value $R++_p$ in the ordered array of vertices $R_p$ at $t(i'') > t >/= t(j=2)$, wherein the further newly inserted value $R++_p$ has $c = c(i''-1) + r(j=1)$, and increasing I by the number of newly inserted values of $R_p$; and means for outputting instructions for changing the physical state of the input material.

In a further embodiment of the system, the $p^{th}$ resource is coupled to the outputting means for receiving therefrom starting and stopping instructions for applying the $p^{th}$ resource to the input material of the $q^{th}$ demand at a beginning time tb of $t(i') </= t_b </= t(j=1)$ until and ending time te of $t(j=2) </= t_e </= t(i'')$. In an additional embodiment of the system, various of the resources are coupled to the system for providing real time feedback on their capacity constraints, including for example, present loading, present physical parameter settings (e.g., temperature, atmosphere, pressure, etc.), present status (e.g., ready, busy, down, etc.), and the like.

In a still further embodiment of the system, the comparing means comprises means for deleting previously existing $R_p$ vertices which, after decrementing and inserting, no longer correspond to changing values of c, and for re-ordering the array of vertices $R_p$ and adjusting I to reflect such deletions.

The forgoing and other aspects and advantages of the invention will be more fully appreciated by reference to the below-listed figures and the detailed description thereof and the examples that follows.

DETAILED DESCRIPTION OF THE FIGURES

Figure 1:
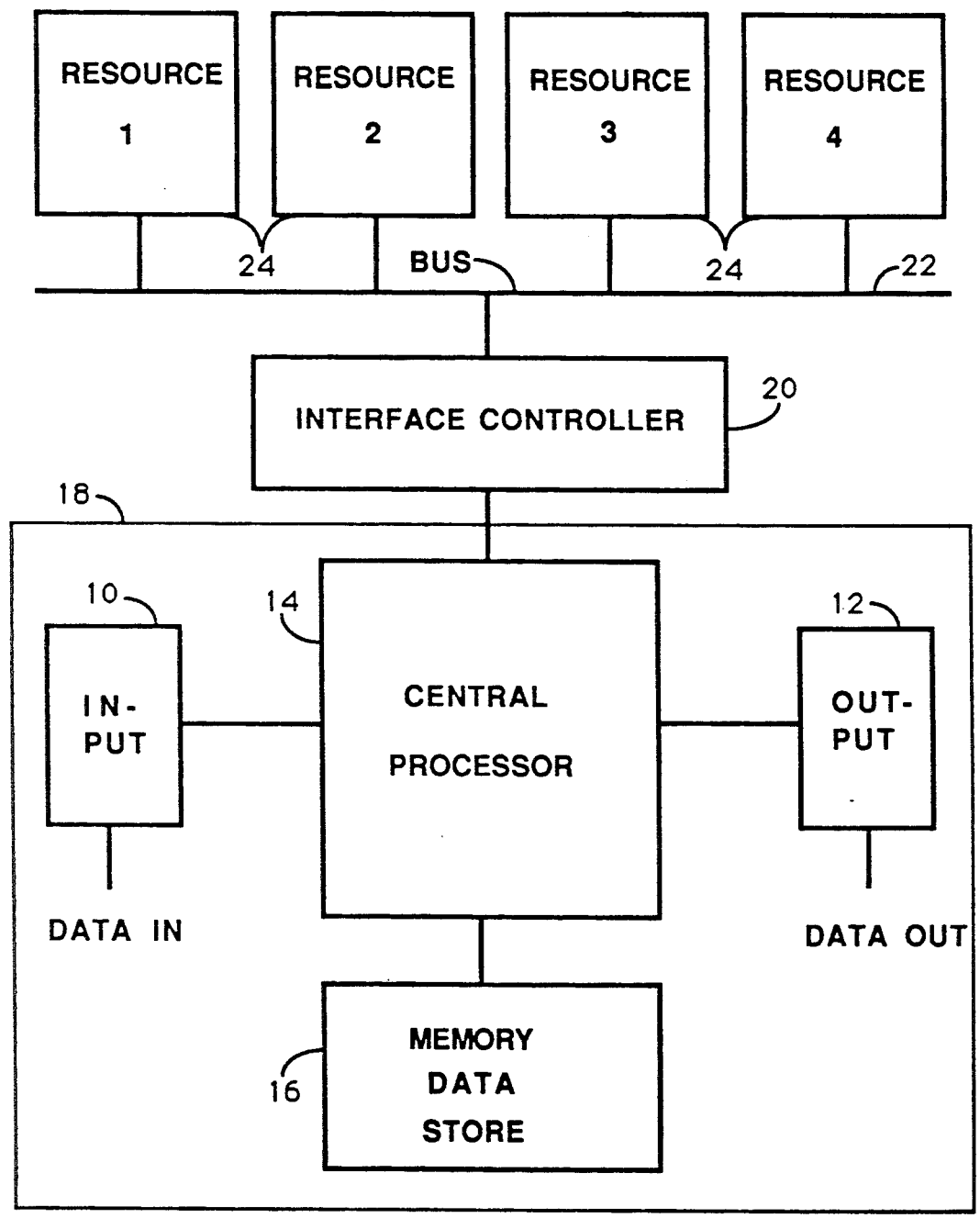
FIG. 1 is a simplified block diagram of a typical computer and communication bus arrangement useful for the present invention.

FIG. 1 shows in simplified form a schematic block diagram of a physical system embodying the present invention, comprising input unit 10 and output unit 12 coupled to processor 14. Memory data store 16 is also coupled to processor 14. Input unit 10 is conveniently a conventional keyboard and CRT, but other data input means well known in the art may also be used. Examples are, paper tape readers, magnetic tape readers, disk readers and the like, to name a few. Output unit 12 is conveniently a printer, but other output units will also serve, such as for example, a modem, a CRT, a tape punch, and a tape or disk drive for recording output information. The combination of input unit 10, output unit 12 central processor 14 and memory and data store 16 makes up computer system 18.

Computer system 18 is desirably but not essentially coupled to interface controller 20 which in turn is coupled to bus 22 which extends to various physical resources 24. Interface controller 20 and bus 22 provide one or two way communication between resources 24 and computer system 18, for the purpose of updating computer system 18 on the status of the various resources and/or allowing computer system 18 to instruct various resources 24 to commence or terminate work on input materials supplied thereto by other means (not shown) or make intermediate adjustments during a particular process step, e.g., when a demand requirement such as for example a processing temperature is to change within a particular resource apparatus.

As those of skill in the art will appreciate based on the description herein, direct communication between computer system 18 and resources 24 is more desirable, but indirect communication involving the intervention of other apparatus or humans is also effective. Those of skill in the art will further appreciate based on the description herein, that the exact hardware configuration of computer system 18 and/or communication system 20, 22 is not critical so long as it performs the functions to be subsequently described.

It is convenient to use a Model TXP computer manufactured by Tandem Corporation of Cupertino, CA which includes a central processor and a memory data store having RAM and non-volatile magnetic storage. A type 3270 input terminal manufactured by IBM of Armonk, NY is coupled thereto as the input device. The output is a conventional printer. Any type of compatible printer may be used. The Tandem computer utilizes the "Guardian" operating system which is well known in the art. The Tandem computer is programmable in Tandem Assembly Language (TAL) which is well known in the art, but other well known computer languages may also be used. The Model TXP Tandem computer is a 32 bit machine with a 83.3 nanosecond micro-instruction time, I/O channel speed up to 5 megabits/second, and CPU capability to address 16 megabits of physical memory and 1 gigabit of virtual memory.

Absent the logical programs described herein which make the computer perform the invented process and which reconfigure the computer into the unique logical apparatus of the present scheduling system, the computer hardware and its operating system and programming languages are entirely conventional. The present invention lies in the combination of hardware and software which results in a unique system having the particular properties described herein and which is uniquely capable of performing the invented process.

While the Tandem computer has been used to implement the present invention, those of skill in the art will understand that other computer hardware, operating systems, and language choices could also be used, provided that they have computational precision and speed suitable for the scheduling precision and complexity desired to be provided. For example, 32 bit single precision or 16 bit double precision machines with MIPS rates of about 0.75 or more are believed to provide reasonable performance for many scheduling applications. As will be subsequently explained, the unique approach of the present invention materially reduces the speed and memory capacity demands placed on the hardware, so that the present invention is particularly adaptable to computers of relatively modest capability.

Figure 2:
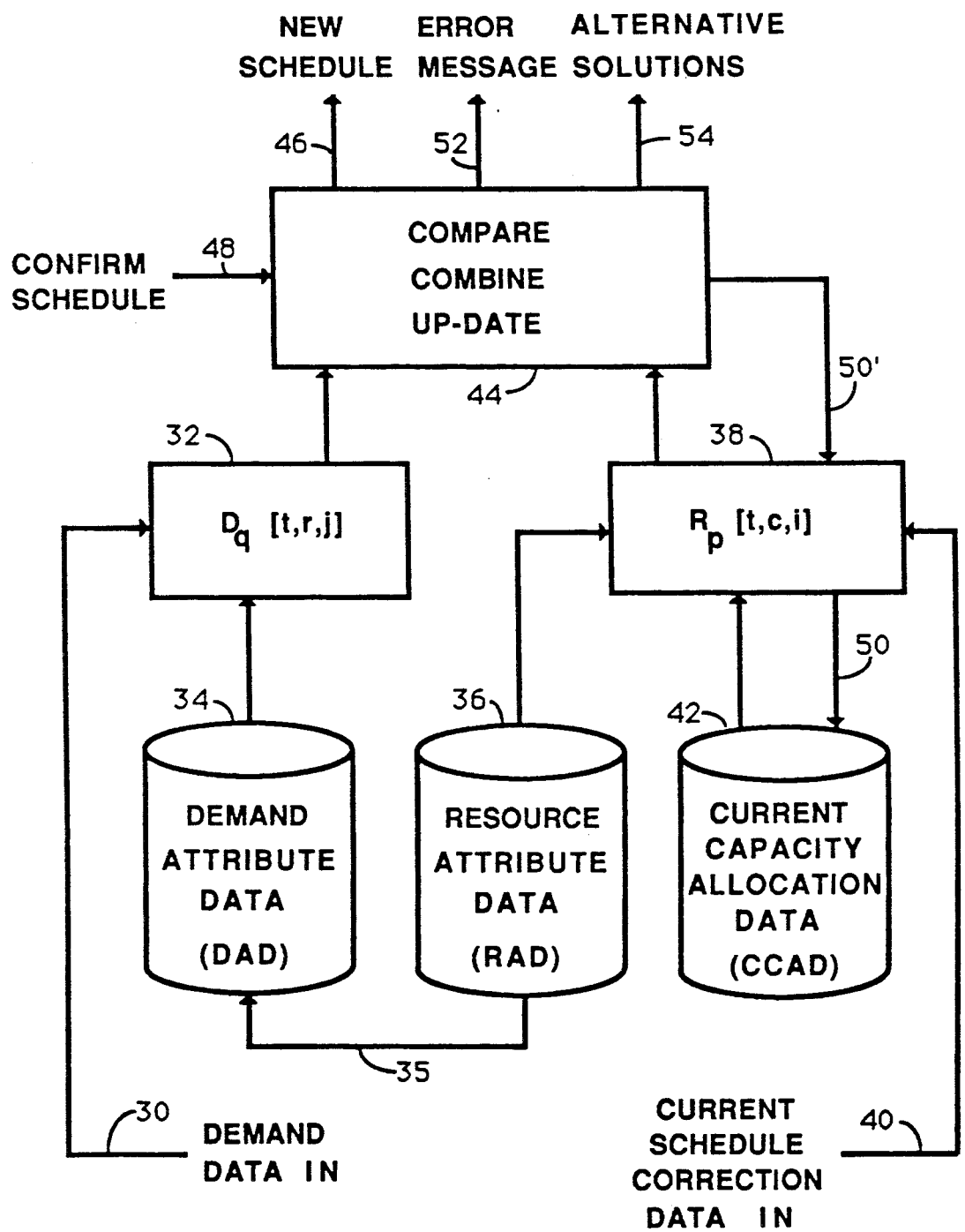
FIG. 2 is a simplified block representation of the logical system of the present invention according to a preferred embodiment.

FIG. 2 shows in simplified schematic form, a block diagram of the planning model of the present invention according to a preferred embodiment thereof. The Demand Attribute Data (DAD) File 34, Resource Attribute Data (RAD) File 36, and Current Capacity Allocation Data (CCAD) File 42 shown in FIG. 2 are logical data store files and may be located in any physical memory space or media. The boxes denoted by the identification numbers 32, 38 and 44 in FIG. 2 are intended to represent logical functions and may be embodied in any physical processor unit. The logical operation of the resource planning system depicted in FIG. 2 will now be described.

Demand Data (DD) 30 is combined in logical unit 32 with Demand Attribute Data (DAD) stored in file 34 to obtain an arrays of demand vertices $D_q[t,r,j]$, defined above. Demand Data generally describes the type of product or service desired to be obtained, the quantity needed, the desired completion (and/or starting) date, and other information concerning special features (e.g., color, quality, authorizations, licenses, etc.) that must be included. In short, Demand Data is a complete description of the relevant information concerning the product or service demanded.

The Demand Data is not by itself directly useful for scheduling. It must be combined with information in the DAD file. The DAD file contains reference information that-relates particular product or service types and features to the process used for providing it. It tells what steps must be provided and in what order to build the product or provide the service and what resources are needed for those steps. The DAD file is generally changed only when there is a change in the process for making a particular product or service. It is desirable when the DAD file information is loaded to check it against the resource information in the RAD file to insure that the DAD file process only asks for physically realizable resources.

The RAD file contains reference information on the resources, i.e., their intrinsic capability, such as for example, their unloaded capacity and achievable parameter ranges (e.g., temperature, atmosphere, forming ability, decision making ability, etc.), and whether they are on-line and ready for use. The RAD file generally only changes when there are changes in the resources or their capabilities. For example, when a new machine or service module is added, data concerning the old unit is removed and replaced by data on the new unit. Also, when a unit is removed from service for repair or maintenance its status would be noted in the RAD file. Generally, there is no information in the RAD file about whether or not the resource is actually being used. Line 35 joining the RAD and DAD Files indicates that information from the RAD File is made available during loading or updating the DAD File for a consistency check. This is to insure that the process/equipment information in the DAD File is consistent with the physical capabilities of the installed resources.

The capacity vertices $R_p[t,c,i]$ 38 are conveniently initialized using RAD file 36 to provide information on resource characteristics (what), unloaded capacity (how much), initial availability (when), any inherent capacity decay information, and anticipated life (shutdown timing), associated with each resource. Current Schedule Correction Data 40 may also be provided to update $R_p$ vertices 38 to reflect any known deviations from the previous schedule that affect resource availability or capacity. Examples of Current Schedule Correction Data are, unplanned equipment outages, strikes, production material shortages, split lots, shortfalls in resource performance, etc. The corrected values of $R_p[t,c,i]$ for each resource p, having available capacity c at time values t, are ordered by increasing time values t and stored in the Current Capacity Allocation Data (CCAD) file 42, as indicated by line 50, with an explicit or implicit index i denoting each change in capacities c and its related time value t.

Those of skill in the art will appreciate based on the description herein that the logical operations required to intialize the resource vertices $R_p$ and update the vertices $R_p$ with the Current Schedule Correction information are similar to the operations required to update the vertices $R_p$ with new demand information, and that the description which follows concerning the modification of the resources vertices $R_p$ to accommodate new demand, applies generally to the above-described operations for obtaining the current values of the vertices $R_p$ which are used as the starting array for scheduling the new demand.

When the time ordered $D_q$ and $R_p$ vertex arrays are current, they are combined and decremented in planning module 44 to provide new proposed schedule 46 reflecting the newly accommodated demand. Confirmation input 48 is available, if desired, for confirming the new proposed schedule. The new schedule is delivered by any appropriate means to the affected resources to cause them to commence processing of the predetermined input material to alter its state to obtain the desired product output or provide the desired service.

Provision is also made to remove any pre-existing $R_p[t,c,i]$ vertices corresponding to changes in capacities c which disappear as a result of accommodating the new demand and to add any new vertices corresponding to changes in capacities c required to be added by the new demand. The vertices are re-ordered by increasing time values t, the index i for each capacity change is altered, if needed, to reflect the relative position of the newly ordered up-dated vertices, and the total number of vertices I adjusted to agree with the new total. This insures that no unnecessary information is being stored. The updated and re-ordered $R_p[t,c,i]$ values reflecting the newly accommodated demand are obtained, as indicated by line 50', and fed back to CCAD file 42, as indicated by lines 50. As noted previously, the values of i and $I=i_{max}$ may be explicitly or implicitly stored. In this manner, CCAD File 42 contains the current schedule and information on all of the work in progress (WIP).

Where the demand vertices $D_q$ and resource vertices $R_p$ are such that a complete solution cannot be found, i.e., some or all of the demand as requested cannot be absorbed by the currently available capacity, then an error message 52 or an alternative suggestion 54 results or both. For example, where a demand having a specified start and/or stop time is presented, and insufficient capacities are available at the specified start and stop times or during the entire specified start-stop interval, then the system will respond that the requested capacity and timing is not available during the scheduling interval. If so desired, the system can also respond with the possible times when the demand could be accommodated during the scheduling interval. This permits the user or the system, depending upon the decision authority allowed, to modify the demanded start/stop times to match those available. Further, if the demand requests a particular resource for an uninterrupted duration dt that is not available within the scheduling interval, then the system can respond with the available times which if combined would equal or exceed dt.

Those of skill in the art will appreciate based on the description herein that the process of combining the $D_q$ and $R_p$ vertex arrays involves algebraically decrementing certain capacities c by the requirements r, but not others. For example, where the particular c and r values being considered involve numerical capacities and requirements (e.g., number of slots in a burn-in oven or spindles on the head of a turret lathe) then the requirement r being scheduled is algebraically subtracted from the currently available capacity c to obtain the up-dated $R_p$ values. However, where the particular c and r values concern a resource parameter that is not reduced in amount by assigning the requirement to that resource, then algebraic subtraction is not appropriate. For example, where the particular capacity and requirement values c, r refer to the temperature range and settings of a burn-in oven or the spindle speed range and setting of a turret lathe head or the color capabilities of a printer (red, blue, green, etc.), then the combining process involves determining whether the required temperature or speed or color is within the available temperature or speed or color capabilities of that resource. In this situation, the comparing and/or combining and/or decrementing process may return, for example, "true" or "false" rather than a numerical value.

In some situations, a numerical or true/false output may not be sufficient, especially when applying a requirement to a resource affects the available choices which may remain after the resource is partly committed. For example, if the resource is a printer or paint rack with capability of handling 1000 units and 3 colors, (e.g., red, green or blue), then assigning a demand requirement for 500 blue units during the interval $dt=t2-t1$ may preclude simultaneously assigning a demand requirement for 500 red units. Once part of the resource capacity is committed to blue units the remaining capacity is only available for further blue units during the time interval dt and cannot be scheduled for red or green units. It is important that the up-dated $R_p$ values reflect this information so that when further scheduling is attempted, the CCAD file shows that during the $dt=t2-t1$ the c value for "color" is limited to "blue".

At the time t2 when the 500 blue units are completed, the c value corresponding to "color" would be reset to the next scheduled color or to the alternative colors if none had yet been scheduled.

Accordingly, as used herein, the words "comparing", "combining" and/or "decrementing" are intended to refer in general to the process of determining whether the available capacity will handle the required capacity and, depending upon the nature of the parameters being compared, returning either a numerical difference where that is appropriate or a true/false output or other information output or both, where that is appropriate.

The process by which $D_q[t,r,j]$ and $R_p[t,c,i]$ are compared and $R_p[t,c,i]$ updated is illustrated in further detail in FIGS. 3-7. For ease of explanation, FIGS. 3-7 reflect quantitative capacities and requirements that are algebraically combinable, as for example, quantity of units that can be heated in an oven or number of applications that can be processed.

Figure 3:
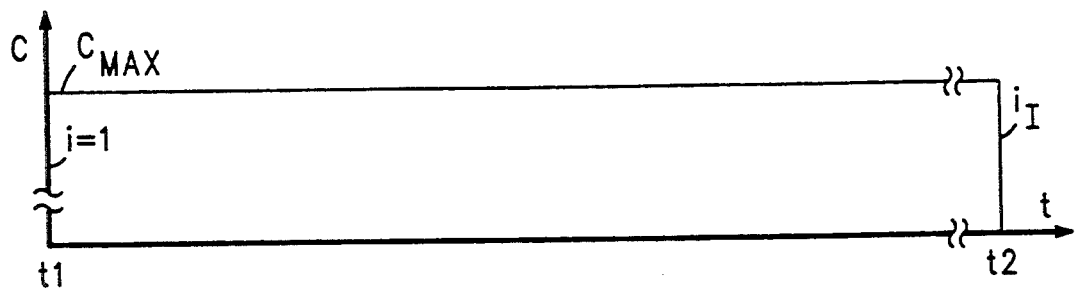
FIGS. 3-5 and 7 are simplified plots of available resource capacity versus time, before and after addition of various demand requirements.

FIGS. 3-5 and 7 show diagrams of the resource vertices $R_p[t,c,i]$ where t is time, c is one or more physical constraints associated with the $p^{th}$ resource and i is an integer index running from 1 to I where I is the total number of times that c has differing values. FIG. 3 shows the initialized, unloaded, capacity vertex array for the $p^{th}$ resource, derived from the RAD File. There is a first vertex $R_p[t1,c_{max},1]$ at time t=t1 where the resource is first available and has its full capacity $c_{max}$, and a second vertex $R_p[t2,c_I,1=2]$ at time t2 where the resource reaches its end-of-useful-life and the available capacity drops to $c_I$, e.g., zero. There are only two vertices, so I=2.

Figure 4:
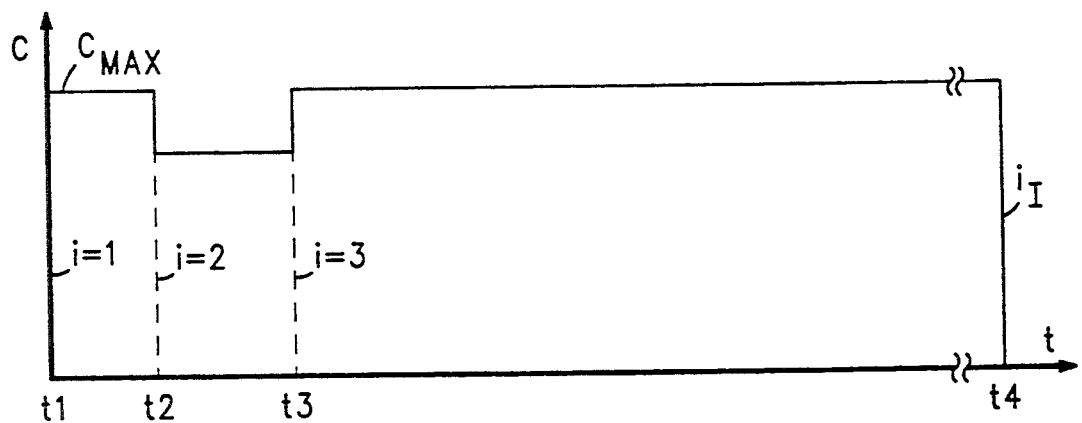
Figure 5:
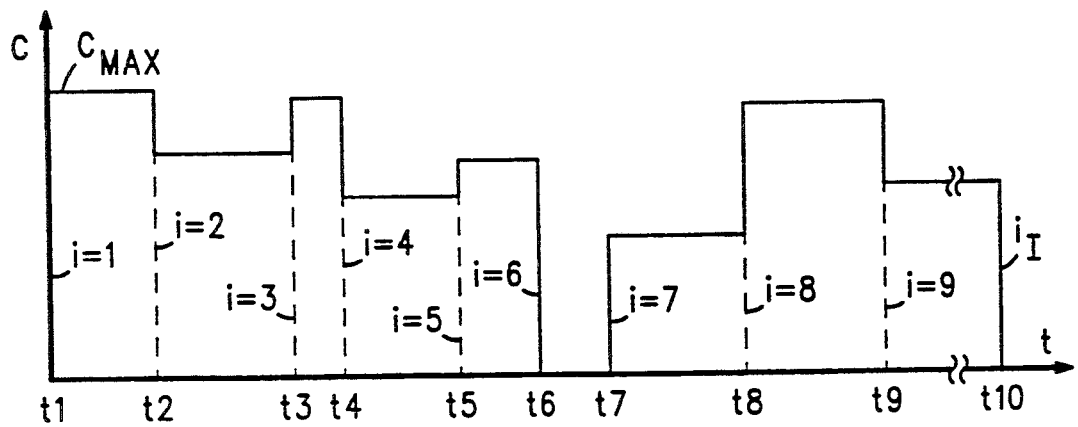

FIG. 4 shows the same capacity vertex array as in FIG. 3, but after a demand requirement has been applied during the interval dt=t3-t2. This is displayed as a reduction in the available value of c during that interval. Two new vertices have been added corresponding to this capacity assignment and the vertices re-ordered and renumbered, and I=4. FIG. 5 is similar to FIG. 4 and depicts the situation after more capacity assignments have been made to meet additional demands. The vertex array has been re-ordered in time, additional index values i assigned and I increased to ten. For each value of index i, there is a corresponding value of t at the time when c changes value. For convenience but not essentially, the convention is adopted that the c value at, for example time t4, is the c value after the requirement applied at t4 is subtracted and that c remains constant at this value during the interval t4>t </=t5. However, this is merely for convenience and other consistent conventions could also be adopted. Similarly, the assignment of the initial $R_p[t,c,i]$ value to have index i=1 is merely arbitrary and any other numerical value could be used, provided that the vertices later in time are arranged in order of increasing time. Further, if the endof-useful-life time is large compared to the scheduling interval, then the final vertex $R_p[t,c,I]$ may be omitted and the value $R_p[t,c,I-1]$ assumed to continue indefinitely. Those of skill in the art will appreciate based on the description herein that many variations may be made on the above described arrangement for labelling the vertex array which achieve the same results.

Figure 6:
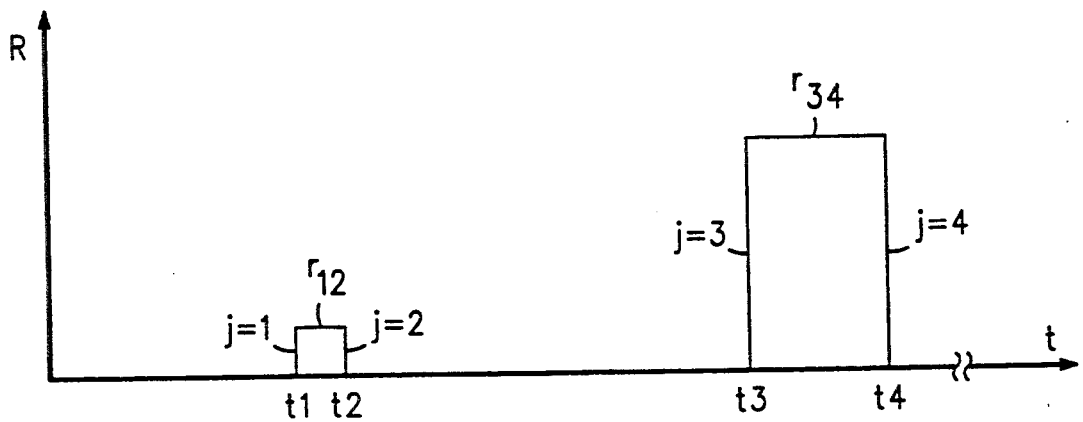
FIG. 6 is a simplified plot of a demand requirement versus time which is combined with FIG. 5 to produce FIG. 7.

FIG. 6 is a plot analogous to FIG. 5 above, but for a demand vertex array $D_q[t,r,j]$ desired to be applied to the capacity vertex array $R_p[t,c,i]$ shown in FIG. 5. Demand vertex array $D_q[t,r,j]$ of FIG. 6 requires quantity $r_{12}$ during the interval dt=t2-t1 and quantity $r_{34}$ during the interval dt=t4-t3, corresponding respectively to the ordered vertices j=1...4, where J=4.

Figure 7:
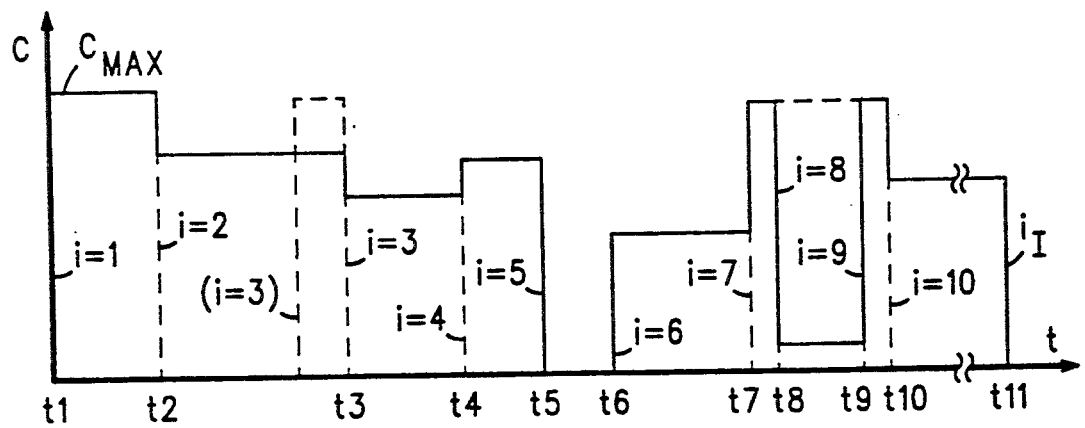

FIG. 7 shows the result of comparing and combining FIGS. 5-6. First, since c>r during the intervals t2-t1 and t4-t3, the demand requirement can be accommodated. Combining $D_q$ and $R_p$ results in the changes to the $R_p$ shown in FIG. 7. The c values during these intervals have been decremented by the desired r quantities. A new schedule accommodating the demand can now be issued and the up-dated and re-ordered capacity vertex array $R_p[t,c,i]$ placed in the CCAD File. Several features of the present system are illustrated.

The time t1 in FIG. 6 is shown as exactly corresponding to the time t3 in FIG. 5 and the requirement amount $r_{12}$ exactly equalling the amount of the available capacity peak between t3 and t4 of FIG. 5. As a result of these conincidences, vertex i=3 of FIG. 5 is no longer present after demand requirement $r_{12}$ is accommodated and has been deleted from FIG. 7, the remaining vertices renumbered and I adjusted accordingly.

The demand requirement $r_{34}$ falls between times t8 and t9 in FIG. 5 and therefore creates two new vertices shown in FIG. 7. The vertices in FIG. 7 are re-indexed after the deletion of the vanished vertex discussed above and the addition of the two new vertices and I totals 11. The ordered up-dated vertex array is stored in the updated CCAD File via 50 (see FIG. 2).

The sequence illustrated in FIGS. 5-7 is repeated for each resource and requirement to determine whether all of the requirements associated with a particular demand can be accommodated, either as initially requested or using one of the alternatives solutions suggested by the system when an exact match is not found.

A significant advantage of the means and method of the present invention as compared to prior art approaches to resource scheduling is the particularly compact data structure associated with the demand and resource vertices and the fine control that it permits over scheduling of the manufacturing or service process. These advantages come about for several reasons.

First, time buckets are not used. The invented system only stores and/or manipulates information corresponding to changes in the resources or demands. Hence, there is no requirement to store or manipulate information concerning time buckets in which nothing is changing, e.g., those time buckets during which a resource is committed to a certain demand. This materially reduces the amount of data that must be stored and manipulated and not only permits less expensive computers and storage files to be used, but materially increases the response speed of the scheduling system.

The vertices $R_p$ and $D_q$ are ordered in terms of increasing time, conveniently using an integer index. The only vertex values that need be stored are those corresponding to each different value of the constraints c or requirements r, and the time value t associated with such differing value. At all intermediate values of time t, the values of c or r are known to be constant and, for convenience, set equal to the value after the last change. If a new demand is accommodated, new vertices are added to the ordered array, in the proper time location. Thus, the ordered relationship is preserved as new demand commitments are accommodated and old ones completed.

While, the vertices $R_p$ and $D_q$ are indicated as including integer indices i and j, these indices need not be explicitly stored. By storing the vertices so that each vertex corresponding to the next i or j value is logically adjacent to the value corresponding to the preceding i or j value, the index is implied without having to be explicitly held in memory. Hence, only the first and last vertices need be specially identified, and no index value need be stored for the intermediate values of the ordered array of vertices for the $p^{th}$ resource and $q^{th}$ demand. This further reduces the memory capacity that must be provided and the access time for retrieving the stored information.

Second, the time values associated with the vertices are not limited by the minimum unit time interval as in the time bucket system, but may have the full precision associated with the computer system and software being employed. This permits a time precision orders of magnitude greater than would be physically possible with the time bucket system, since with a time bucket approach the time precision can only be increased at the expense of increasing the total number of time buckets that must be stored and manipulated. For real systems of any significant complexity, it is not possible to have a fine grained time measure in a time bucket approach.

Those of skill in the art will also appreciate, based on the description herein, that the great time precision permitted by the invented scheduling system does not increase the data storage requirement, since the time precision is limited by the length of the computer word and not by the size of the data store. Increasing the size of the data store allows more events to be scheduled but does not affect the precision of the scheduled time values. For example, implementing the present invention using a computer having a 32 bit single precision or 16 bit double precision numerical calculation and storage capability allows resource scheduling to a precision of one second over a scheduling interval of about a century, and correspondingly greater precision over shorter scheduling intervals. This is another substantial advantage of the invented system.

Exhibits A.1-B.5 illustrate pseudo-code suitable for performing various of the evaluation and vertex insertion/deletion tasks described above. Exhibits A.1-A.5 show examples of pseudo-code for performing evaluations in connection with comparing the demand to the resources, and Exhibits B.1-B.5 show example of pseudo-code for inserting/deleting vertices in the ordered arrays. There is an Exhibit B.1-B.5 corresponding to each Exhibit A.1-A.5. Introductory sections are provided with each pseudo-code exhibit to facilitate understanding of what functions are being performed and how they relate to the other routines. Persons of skill in the art will understand, based on the disclosure herein, how the logical system described by these pseudo-code examples functions and how they would be implemented in real code of whatever computer language the user choses to adopt for his own circumstances. Pseudocode listings such as these are commonly used in the art and their interpretation is well understood.

Based on the description and exhibits herein, those of skill in the art will appreciate that if the demand as initially stated cannot be met by the available resources, that the invented system not only indicates a failure to match but also returns information that is especially convenient for deciding how the initial demand could be modified so that it can be accommodated by the available resources. For example, in Exhibit A.1, first page, line 41 to second page, line 13, various alternative parameters or informational suggestions are indicated as possible returns. Thus, if the resource being checked is not available at the requested time, then the system returns the parameter "first_time_quantity_and_duration_available_as_requested", and/or if the requested quantity is not available for the requested duration, the system returns the parameter "max_quantity_available_for_requested_duration" and the "max_quantity_available_date". This information allows the operator to modify the requested demand to better match the particular resource combination actually available.

For example, having the "max_quantity_available_or_requested_duration" and the "max_quantity_available_date" information allows the operator, among other things, to consider the possibility of splitting the manufacturing lot into two or more parts to utilize partially available capacity at different times. As those of skill in the art will appreciate, having this kind of information makes it possible to greatly improve the efficiency of utilization of the resources.

Further, by providing the system with the decision making rules applicable to such trade-offs, the system can with this information automatically perform the optimization process. This is a significant improvement over prior art systems.

Having thus described the invention, those of skill in the art will appreciate based on such description that many variations made be made without departing from the spirit and intent of the present invention. For example, but not intended to be limiting, other hardware may be utilized to achieve the same logical system as described herein, or the details of how the vertex arrays are manipulated may be varied while achieving the same result. Accordingly, it is intended to include such variations in the claims that follow.

EXHIBIT A.1
MAIN RESOURCE EVALUATION ROUTINE

```
This routine calls different evaluation routines based on their type.
    The following basic types of resources are represented: normal
    resources, consumable resources, resources that are sharable but
    uninterruptable once processing has started, and resources that
    allow fragmented usage time periods (usage duration is not required
    to be contiguous).

(Assumptions;
    1) That any resou :ce value that changes relative to time will be
    represented by a dimension in the vertices array. The first vertex
``` value in the vertices array will contain the boundary limit as
specified in the RAD file. A list of evaluation requirements such
as usage, min and max will be associated to each dimension in the
vector.
2) That any resource value, static_parameter, that does not change
relative to time will be a value in a parameter list associated to
a particular resource id. Resource values of this type must have
flag set in the RAD file for each parameter value of this type.
3) That vertices are sequenced or order dependent.}

{initialization parameters from RESOURCE_ATTRIBUTE_DATA FILE}
    resource_id
    capacity (quantity and other attributes)
    maintenance information {calling parameters form planning model}
    resource_id
    requested_start_time
    requested_duration or prefered_duration
    requested_quantity and other attributes requirements
    static_parameter requirement list
    maximum_allowed_wait
    maximum_duration
    minimum_duration
    do_not_start_earlier_time
    do_not_finish_after_time {returned parameters are based on type of resource being evaluated}
    {unmatched parameters}
        resource_type
        insertion_flag
        found_required_resources (defined by successful or
            unsuccessful evaluation)
        capacity
        first_time_any_available
        first_time_requested_quantity_available_after_being_unavai
            lable
        first_time_quantity_and_duration_available_as_requested
        slack_time
        first_time_quantity_available_as_requested
        completion_time
        starting_buffer_time
        projected_duration
        projected_maximum_duration
        projected_minimum_duration
        ending_buffer_time
    {matched pair}
        quantity_available_at_requested_start_time
        first_time_start_quantity_unavailable
    {matched pair}
        max_quantity_available_for_requested_duration (limited to
            quantity requested and a start time frame of up to
            requsted_start plus maximum_allowed_wait)
        max_quantity_available_date

•initialize return parameters, based on evaluation failure

{initilize vector if it does not exist}
- if vector for resource_id requested does not exist
    - if resource_attribute_information exists in the
        'RESOURCE_ATTRIBUTE_DATA FILE'
            - initialize the resource vertices
      else
            {exit with failure values in return parameters}
            - return to planning model control program

- set return parameter resource type based on whether resource is
  consumable, fragmentable, sharable but uninterruptable or normal
{check resource attributes that do not change over time for
  compliance}
- Loop thru requested_static_parameters
    - compare the requested_static_parameter values from the
        'DEMAND_ATTRIBUTE_DATA FILE' against
        resources_static_parameter values from the
        'RESOURCE_ATTRIBUTE_DATA FILE'
        - if they are incompatable
            {exit with failure values in return parameters}
            - return to planning model control program

- **** STATIC PARAMETERS ARE OK -- CHECK THE ATTRIBUTES THAT CHANGES
  WITH TIME ****
- select the vertex in the capacity vertex array whose time element is
  just less than or equal to the requested_time and store it's
  location in variable current_location
- select only one of the following routines based on the resource_type
    - resource_type = consumable resource then call
        consumable_evaluation
    - resource_type = fragmentable resource then call
        fragmentable_evaluation
    - resource_type = sharable but uninterruptable resource then call
        logical_evaluation
    - otherwise then call normal_evaluation
- return to planning model

EXHIBIT A.2
NORMAL RESOURCE EVALUATION

This routine evaluates resources that are sharable or nonsharable,
  that require contiguous duration times, and that are interruptable
  and not consumable.

{Assumptions;
  1) That any resource value that changes relative to time will be
  represented by a dimension in the vertices array. The first vertex
  value in the vertices array will contain the boundary limit as
  specified in the ¯AD file file. A list of evaluation requirements
  such as usage, min and max will be associated to each dimension in
  the vector.
  2) That any resource value, static_parameter, that does not change
  relative to time will be a value in a parameter list associated to
  a particular resource id. Resource values of this type must have
  flag set in RAD file for each parameter value of this type.
  3) That vertices are sequenced or order dependent.
  4) That nonsharable resources should request the capacity limit
  when inserting commitments}

{calling parameters form planning model}
        resource_id
        requested_start_time
        requested_duration
        requested_quantity and other attributes requirements
        maximum_allowed_wait
                maximum_duration
                dont_finish_aftertime
                dont_take_aftertime
        index {returned parameters to planning model}
        {unmatched parameters}
                found_required_resources
                capacity
                first_time_any_available
                first_time_requested_quantity_available_after_being_unavailable
                first_time_quantity_and_duration_available_as_requested
                slack_time
                completion_time
        {matched pair}
                quantity_available_at_requested_start_time
                first_time_start_quantity_unavailable
        {matched pair}
                max_quantity_available_for_requested_duration {limited to
                        quantity requested and a start time frame of up to
                        requsted_start plus maximum_allowed_wait}
                max_quantity_available_date

••• CHECK THE VERTICES FOR AVAILABILITY AS REQUIRED •••
•set return parameter, capacity, to the first elements quantity
  attribute value in the capacity_vertex_array
•set stop_evaluation to false
•set quantity_available_at_requested_start_time to value indexed by
  current_location in the capacity_vertex_array
•loop through the capacity_vertex_array using an index until
  stop_evaluation equals true

•if the first_time_any_available return parameter has not been
          set and the indexed capacity_vertex_array compatable quantity
          is greater than zero then
                •set first_time_any_available to time indexed or
                  requested_start_time whichever is greater

•if the return parameter first_time_start_quantity_unavailable
          has not been set and the indexed capacity_vertex_array
          compatable quantity is less than the
          quantity_available_at_requested_start_time then
                •set first_time_start_quantity_unavailable to time indexed
                  or requested_start_time whichever is greatest

•if the indexed capacity_vertex_array compatable quantity is not
          less than requested_value
                •if first_time_requested_quantity_is_available return
                  parameter has not been set then
                        •set first_time_requested_quantity_is_available to time indexed or requested_start_time whichever is greatest
- if the next indexed capacity_vertex_array time (next vertex time) is not less than requested stop_time
  {SUCCESS resource is available as requested}
  - set found_required_resources return parameter to true
  {continue to loop until indexed capacity_vertex_array compatable quantity is less than requested_value to find resource slack_time} else
- set first_time_requested_quantity_unavailable return parameter to time indexed or requested_start_time whichever is greatest
- if found_required_resources equals true
  {save resource slack time}
  - set slack_time to time indexed minus requested_stop_time
  - set completion_time to requested_stop_time
  - RETURN to planning model {we are successful}
  {FAILURE resource is not available as requested}
  - set stop_evaluation to true

** EVALUATE FOR THE FUTURE SINCE WE FAILED FOR THE TIME REQUESTED **

{initial parameters}
- Create a list with a pair of values for each list node. The pair of values will represent max_quantity_available_for_requested_duration and max_quantity_available_date. Set the first pair to the values of the quantity_available at the time indexed and requested_start_time respectively.

{continue to use the same index used in the above loop evaluation}
- loop forever
  - if first_time_any_available equals infinity and the value indexed is reater than zero
    - set the return parameter first_time_any_available to the time indexed
  - if first_time_start_quantity_unavailable equals zero and quantity_available_at_requested_start_time is greater than value indexed
    - set the return parameter first_time_start_quantity_unavailable to time indexed or requested_start_time whichever is greater
  - if the return parameter max_quantity_available_for_requested_duration is not equal to quantity_requested
    - loop through the list of paired max_quantity_available_for_requested_duration and max_quantity_available_date nodes
      - if max_quantity_available_date at the current list node plus requested_duration is less than time indexed
        - if the max_quantity_available_for_requested_duration at the current list node is greater than the associated return parameter than
          - set the associated return parameter values
                (max_quantity_available_for_requested
                _duration and
                max_quantity_available_date) to the
                values contained in this node
        •delete the indexed node from the list
    else
        •if the
            max_quantity_available_for_requested_durati
            on at the current list node is greater than
            the quantity attribute value in the
            capacity_vertex_array than
                •set
                    max_quantity_available_for_requested_
                    duration at the current list node to
                    the quantity attribute value in the
                    capacity_vertex_array
                •loop through remaining nodes in the
                    list
                        •delete the node (since the nodes
                            are in ascending order of
                            increasing quantity and time,
                            they can not be as significant
                            as this node)
    •if (the requested_start_time plus maximum_allowed_wait is
        not less than time indexed) and (valued indexed is
        greater than previous indexed value in the
        capacity_vertex_array) than
            •insert a new node in the
                max_quantity_available_for_requested_duration and
                max_quantity_available_date list with the values
                of the currently indexed quantity and time in the
                capacity_vertex_array
            •if max_quantity_available_for_requested_duration is
                greater than requested_quantity
                    •set
                        max_quantity_available_for_requested_durati
                        on to requested_quantity
•if value indexed is less than requested_quantity
    •if
        first_time_quantity_and_duration_available_as_requeste
        d is not greater than time indexed minus
        requested_duration
                •set slack_time to time indexed minus
                    (first_time_quantity_and_duration_available
                    _as_requested plus requested_duration)
                •set completion_time to
                    first_time_quantity_and_duration_available_
                    as_requested plus requested_duration
                •RETURN (Note we may leave some parameters
                    unevaluated, but this would be the best
                    solution anyway. Thus we might as well
                    stop)
    else
        •set
            first_time_quantity_and_duration_available_as_req
            uested to infinity (reset and look further into
            the future for availability)

- if
    first_time_requested_quantity_available_after_being_unavailable equals zero and
    first_time_requested_value_is_available is not equal to infinity
    - set return parameter
        first_time_requested_quantity_available_after_being
        _unavailable to time indexed
  else
    - if first_time_requested_quantity_is_available equals infinity
        - set first_time_requested_quantity_is_available to time indexed
    - if first_time_quantity_and_duration_available_as_requested equals infinity
        - set
            first_time_quantity_and_duration_available_as_requested to time indexed
      else
        - if
            first_time_quantity_and_duration_available_as_requested is not greater than time indexed minus requested_duration
            - loop incrementing the time index until time indexed equals infinity
                - if value indexed is less than requested_quantity then
                    - set the return parameter
                        slack_time to time indexed minus
                        (first_time_quantity_and_duration_available_as_requested plus requested_duration)
                    - set the return parameter
                        completion_time to
                        first_time_quantity_and_duration_available_as_requested plus requested_duration
                    - RETURN (Note we may leave some parameters unevaluated, but this would be the best solution anyway. Thus we might as well stop)
- if time indexed equals infinity
    - RETURN
- increment index
- RETURN (This return should never be executed)

EXHIBIT A.3
TIME FRAGMENTABLE RESOURCE EVALUATION

This routine evaluates the availability of resources whose processing durations are not required to be contiguous. Labor is good example of such a resource, since work activities may span accross break periods.

{Assumptions;
  1) That any resource attribute that changes relative to
    time will be represented by a dimension in the vertices
    array. The first vertex value in the vertices array will
    contain the boundary limit as specified in the RAD file.
    A list of evaluation requirements such as usage, min and
    max will be associated to each dimension in a particular
    vectex.
  2) That any resource value, static_parameter, that does
    not change relative to time will be a value in a
    parameter list associated to a particular resource id.
    Resource values of this type must have a flag set in RAD
    file for each parameter value of this type.
  3) That Values and Parameters are sequenced or order
    dependent {calling parameters}
    resource_id
    requested_start_time
    requested_duration
    requested_quantity
    index {returned parameters}
    {unmatched parameters}
        found_required_resources
        first_time_any_available
        capacity {current or future success based on fulfilling all of the users
      requirements}
        first_time_quantity_available_as_requested
        completion_time
        slack time
        quantity_available_at_requested_start_time
        first_time_start_quantity_unavailable {initial returned parameters, based on failure}
•set slack_time to zero
•set first_time_quantity_available_as_requested to infinity
•set found_required_resources to false
•set completion_time to infinity
•set first_time_any_available to infinity

•set remaining_length to requested_duration

•••• CHECK THE VERTICES FOR AVAILABILITY AS REQUIRED •••

•set the return parameter, capacity, to the first elements quantity
  attribute value in the capacity_vertex_array
•set quantity_available_at_requested_start_time to value indexed by
  current_location in the capacity_vertex_array
•loop through the vertices in the capacity_vertex_array
    •if the indexed vertex quantity is greater than zero
      •set return parameter first_time_any_available to time
        indexed
    •if the return parameter first_time_start_quantity_unavailable has not been set and the indexed capacity_vertex_array
compatable quantity is less than the
quantity_available_at_requested_start_time then
- set first_time_start_quantity_unavailable to time indexed
  or requested_start_time whichever is greatest
- if the indexed vertex quantity is greater than or equal to
  requested_quantity
    - if first_time_quantity_available_as_requested equals
      infinity
        - set return parameter
          first_time_quantity_available_as_requested to
          time indexed or requested_start_time whichever is
          less
    - if remaining_length minus (the next vertex time minus
      current vertex time) is less than or equal to
      remaining_length
        - set return parameter completion_time to current
          vertex time plus remaining_length
        - set return parameter found_required_resources to
          true
        - set return parameter slack_time to the last time
          value in the capacity_vertex_arrays who's
          quantity is not less than requested_quantity
        - RETURN
    else
        - set remaining_length to remaining_length minus (the
          next vertex time minus current vertex time)
- RETURN

EXHIBIT A.4
LOGICAL EVALUATION FOR
SHARABLE BUT UNINTERRUPTABLE RESOURCES

This routine evaluates the availability of a logical resource that
is sharable but uninterruptable during the processing activity. An
example of this type of resource would be a vacuum chamber, which
would lose its internal pressure if opened during the middle of a
processing activity.

{Assumptions;
   1) That any resource value that changes relative to time will be
   represented by a dimension in the vertices array. The first
   vertex value in the vertices array will contain the boundary
   limit as specified in the RAD file. A list of evaluation
   requirements such as usage, min and max will be associated to
   each dimension in the vector.
   2) That vertices are sequenced or order dependent.
   3) Each activity will have a maximum activity duration, minimum
   activity duration and preferred activity duration.
   4) Each start commitment is seperated by a one second spike to
   represent the the start of a processing commitment. (inserted by
   logical_insertion routine)
   5) That this routine evaluates a nonexistent resource but a
   logical one that will control process starts and completion.
   This routine will stage the start of a process for a resource so
   that multiple lots can be processed concurrently even when their
   processing can not be interrupted. This implies a sharable but
   uninterruptable processing requirement.

6) That the do not take early time and do not take after time are computed using minimum and maximum activity durations respectively. Hence activity durations can be modified without adversely effecting other commitments.
7) That the RAD file defines the default initial buffer time for a lot to wait for other lots to increase the likelyhood of sharing resources.
8) That the calling routine sets the vertex_capacity_array index to the vertex that is just less than or equal to do_not_start_earlier_time {calling parameters form planning model}
    resource_id
    prefered_duration
    maximum_duration
    minimum_duration
    do_not_start_earlier_time
    do_not_finish_after_time
    index {returned parameters}
    found_required_resources (defined by successful or unsuccessful evaluation)
    first_time_quantity_and_duration_available_as_requested (defined by successful or unsuccessful evaluation)
    starting_buffer_time (defined by successful or unsuccessful evaluation)
    completion_time (defined by successful evaluation)
    projected_duration (defined by successful evaluation)
    projected_maximum_duration (defined by successful evaluation)
    projected_minimum_duration (defined by successful evaluation)
    ending_buffer_time (defined by successful evaluation)
    insertion_flag

••• CHECK THE VERTICES FOR AVAILABILITY AS REQUIRED •••
•reduce do_not_finish_after_time, prefered_duration, maximum_duration and minimum_duration by one for vertex spike between commitments
•set first_time_quantity_and_duration_available_as_requested return parameter to infinity
•if the indexed capacity_vertex_array quantity is equal to one) and (the next index (index plus one) capacity_vertex_array time is not less than (do_not_start_earlier_time plus minimum_duration) then
    {success identify return parameters}
    •set insertion_flag to true
    •set found_required_resources to true
    •set first_time_quantity_and_duration_available_as_requested return parameter to the time indexed in vertex_capacity_array
    •if the next index (index plus one) capacity_vertex_array time is not less than the first_time_quantity_and_duration_available_as_requested plus maximum_duration then
        •set the return parameter projected_maximum_duration to requested maximum_duration
        •set the return parameter projected_duration to prefered_duration
    else

- set the return parameter projected_maximum_duration to the time indexed in vertex_capacity_array minus first_time_quantity_and_duration_available_as_requested
- if the next index (index plus one) capacity_vertex_array time is not less than the first_time_quantity_and_duration_available_as_requested plus prefered_duration then
  - set the return parameter projected_duration to the time indexed in vertex_capacity_array minus first_time_quantity_and_duration_available_as_requested
- set the return parameter projected_minimum_duration to requested minimum_duration
- if this resource's default buffer time is less than (the vertex_capacity_array's time element (current index plus one) minus (first_time_quantity_and_duration_available_as_requested plus projected_duration)) then
  - set return_parameter staring_buffer_time to this resources default buffer time else
  - set return_parameter starting_buffer_time to (the time indexed in vertex_capacity_array minus (first_time_quantity_and_duration_available_as_requested plus projected_duration))
- if starting_buffer_time is greater than (do_not_finish_after_time minus (first_time_quantity_and_duration_available_as_requested plus projected_duration)) then
  - set return_parameter starting_buffer_time to (do_not_finish_after_time minus (first_time_quantity_and_duration_available_as_requested plus projected_duration))
- set first_time_quantity_and_duration_available_as_requested to first_time_quantity_and_duration_available_as_requested plus starting_buffer_time
- set completion_time to first_time_quantity_and_duration_available_as_requested plus projected_duration
- if do_not_finish_after_time is less than the vertex_capacity_array's time element (current index plus one)
  - set ending_buffer_time to do_not_finish_after_time minus completion_time else
  - set ending_buffer_time to (the capacity_vertex_array's time element (current index plus one) minus completion_time
- increment completion_time, projected_duration, projected_maximum_duration and projected_minimum_duration to account for vertex spike
- return
- if the capacity_vertex_array's time element at the current index equals the do_not_start_earlier_time then decrement the index by one
- set latest_start to do_not_start_earlier_time or (the capacity_vertex_array's time element (current index plus one) minus the capacity_vertex_array's starting_buffer_time (current index plus one)) whichever is greater
- if (the indexed capacity_vertex_array quantity is equal to one) and
  (latest_start plus the capacity_vertex_array's
  minimum_duration_time value (current index plus two)) is less than
  the do_not_finish_after_time) and (the requested maximum_duration
  is less than the minimum_duration_time value in the
  capacity_vertex_array (current index plus two)) and (the requested
  minimum_duration is less than the maximum_duration_time value in
  the capacity_vertex_array (current index plus two)) then
  {success identify return parameters}
    - set found_required_resources to true
    - set insertion_flag to false
    - set resource's_duration to the capacity_vertex_array's time
      element (current index plus two) minus the
      capacity_vertex_array's time element (current index plus one)
    - compute the return parameter projected_duration based on
      complying with the requested minimum and maximum durations,
      and minimum and maximum durations in the
      capacity_vertex_array (current index plus two). The new
      duration should be as close to prior resource's_duration as
      possible
    - set the return parameter projected_maximum_duration to
      requested maximum_duration or the maximum_duration_time value
      in the capacity_vertex_array (current index plus two)
      whichever is less
    - set the return parameter projected_minimum_duration to
      requested minimum_duration or the minimum_duration_time value
      in the capacity_vertex_array (current index plus two)
      whichever is greater
    - if the projected_maximum_duration is greater than
      (do_not_finish_after_time minus latest_start) then
        - set the return parameter projected_maximum_duration
          (do_not_finish_after_time minus latest_start)
        - if the project_duration is greater than
          (do_not_finish_after_time minus latest_start) then
            - set the return parameter project_duration to
              (do_not_finish_after_time minus latest_start)
    - if the vertex_capacity_array's starting_buffer_time element
      (current index plus one) is less than (the
      vertex_capacity_array's time element (current index plus one)
      minus do_not_start_earlier_time) then
        - set return_parameter starting_buffer_time to the
          vertex_capacity_array's starting_buffer_time element
          (current index plus one)
        - set do_not_start_earlier_time to (the
          vertex_capacity_array's time element (current index
          plus one) minus the vertex_capacity_array's
          starting_buffer_time element (current index plus one))
      else
        - set return_parameter starting_buffer_time to the
          vertex_capacity_array's time element (current index
          plus one) minus do_not_start_earlier_time
    - if starting_buffer_time is greater than
      (do_not_finish_after_time minus (do_not_start_earlier_time
      plus projected_duration)) then
        - set return_parameter starting_buffer_time to
          (do_not_finish_after_time minus (do_not_start_earlier_time plus projected_duration))
  • set first_time_quantity_and_duration_available_as_requested to
      first_time_quantity_and_duration_available_as_requested plus
      starting_buffer_time
  • set completion_time to
      first_time_quantity_and_duration_available_as_requested plus
      projected_duration
  • if do_not_finish_after_time is less than the
      vertex_capacity_array's time element (current index plus two)
      plus the vertex_capacity_array's ending_buffer_time (current
      index plus two)
        • set ending_buffer_time to do_not_finish_after_time minus
            completion_time
  else
        • set ending_buffer_time to the capacity_vertex_array's
            ending_buffer_time element (current index plus two)
  • increment completion_time, projected_duration,
      projected_maximum_duration and projected_minimum_duration to
      account for vertex spike
  • return

• increment index
• loop until end of vertices
    • if [the indexed capacity_vertex_array quantity is equal to one)
        and (the next index (index plus one) capacity_vertex_array
        time is not less than (do_not_start_earlier_time plus
        minimum_duration)] or [the indexed capacity_vertex_array
        quantity is equal to zero) and (the requested
        maximum_duration is less than the minimum_duration_time value
        in the capacity_vertex_array (current index plus one)) and
        (the requested minimum_duration is less than the
        maximum_duration_time value in the capacity_vertex_array
        (current index plus one))] then
            • set
              first_time_quantity_and_duration_available_as_requested
              to the indexed capacity_vertex_array time minus this
              resource's default buffer time
            • set starting_buffer_time to this resource's default
              buffer time
            • set found_required_resources to false
            • return
    • increment index

EXHIBIT A.5
CONSUMABLE RESOURCE EVALUATION

This routine evaluates resources that are consumed and not
  normally available for use after once being used.

{Assumptions;
  1) Dates and times to indicate when new amounts of
     consumable type resources will become available for
     consumption will be set in the RAD file.
  2) That any resource value, static_parameter, that does
     not change relative to time will be a value in a
     parameter list associated to a particular resource id.
     Resource values of this type must have flag set in RAD
     file for each parameter value of this type.

3) That Values and Parameters are sequenced or order dependent
4) That no fragmentation resources are evaluated with this loop {calling parameters}
    resource_id
    requested_start_time
    requested_quantity
    index {returned parameters}
    {unmatched parameters}
        found_required_resources
        first_time_any_available
        quantity_available_at_requested_start_time
        first_time_quantity_available_as_requested {initial returned parameters, based on failure}
•set quantity_available_at_requested_start_time to zero
•set first_time_any_available to infinity
•set first_time_quantity_available_as_requested to infinity
•set found_required_resources to false

•••• CHECK THE VERTICES FOR AVAILABILITY AS REQUIRED •••
•get axis_offset_value from resource parameters list
•set stop_evaluation to false
•set quantity_available_at_requested_start_time to value indexed by
   start_location minus axis_offset_value
•if quantity_available_at_requested_start_time is greater than or
   equal to requested_quantity
      •set found required resources to true
      •RETURN
•loop through the capacity_vertex_arra using a index
      •set number_avialable to vertex value indexed minus axis value
      •if first_time_any_available equals infinity and
         number_available is greater than zero
           •set first_time_any_available to time value indexed
      •if number_available is greater than or equal to
         requested_quantity
           •set first_time_quantity_available_as_requested to time
             indexed
           •RETURN
•RETURN

EXHIBIT B.1
MAIN EVALUATION VERTEX INSERTION ROUTINE

This routine calls different insertion routines based on their type. The following basic types of resources are represented by: normal resources, consumable resources, resources that are sharable but uninterruptable once processing has started, and resources that allow fragmented usage time periods (usage duration is not required to be contiguous).

{Assumptions;
   1) That any resource value that changes relative to time will be
      represented by a limension in the vertices array. The first vertex
      value in the vertices array will contain the boundary limit as specified in the RAD file. A list of evaluation requirements such
as usage, min and max will be associated to each dimension in the
vector.
2) That any resource value, static_parameter, that does not change
relative to time will be a value in a parameter list associated to
a particular resource id. Resource values of this type must have
flag set in RAD file for each parameter value of this type.
3) That vertices are sequenced or order dependent.}

{calling parameters form planning model}
    resource_id
    requested_start_time
    requested_stop_time
    requested_quantity and other attributes requirements
    resource type {normal, logical, fragmentable, consumable, non-
    sharable}
    insertion_flag {returned parameters to planning model}
    insertion_status
•initialize return parameter, based on insertion success {if vector does not exist}
•if vector for resource_id requested does not exist
    •set insertion_status to failure
    {exit with failure values in return parameters}
    •return to planning model control program

•select the vertex in the capacity vertex array who's time element is
   just less than or equal to the requested_time and store it's
   location in variable current_location
•select only one of the following routines based on the resouce_type
    •resouce_type = consumable then call consumable_insertion
    •resouce_type = fragmentable then call fragmentable_insertion
    •resouce_type = sharable but uninterruptable then call
       logical_insertion
    •otherwise then call normal_insertion
•return to planning model

EXHIBIT B.2
NORMAL RESOURCE EVALUATION
VERTEX INSERTION ROUTINE

This routine insert commitments for resources that are sharable or
   nonsharable, that require contiguous duration times, and that are
   interruptable and not consumable.

{Assumptions;
   1) That any resource value that changes relative to time will be
   represented by a dimension in the vertices array. The first vertex
   value in the vertices array will contain the boundary limit as
   specified in the RAD file. A list of evaluation requirements such
   as usage, min and max will be associated to each dimension in the
   vector.
   2) That any resource value, static_parameter, that does not change
   relative to time will be a value in a parameter list associated to
   a particular resource id. Resource values of this type must have flag set in RAD file for each parameter value of this type.
3) That vertices are sequenced or order dependent.
4) That nonsharable resources should request the capacity limit when inserting commitments}
}

{calling parameters from main insertion routine}
    resource_id
    requested_start_time
    requested_stop_time
    requested_quantity and other attributes requirements
    starting_index_location
    index {returned parameters to planning model}
    insertion_status

- if time indexed in capacity_vertex_array is not equal to the requested_start_time
    - create a new entry in the capacity_vertex_array
    - set the time value for this new entry to the requested_start_time
    - set the quantity and other attributes in the capacity_vertex_array's new entry to the values of the associated quantity and other attributes requirements of the previous vertex
    - increment the index to the new entry's array position
else
    - if the previous vertex's quantity and other attributes equals the indexed quantity and other attributes adjusted by the associated requested_quantity and other attributes then
        - delete the current index
        {index should be pointing at what was the next vertex}
- loop until the time indexed in capacity_vertex_array is greater than or equal to the requested_stop_time
    - adjust the indexed quantity and other attributes in the capacity_vertex_array by the values of the associated requested_quantity and other attributes requirements of the previous vertex
    - increment the index
- if time indexed in capacity_vertex_array is not equal to the requested_stop_time
    - create a new entry in the capacity_vertex_array
    - set the time value for this new entry to the requested_stop_time
    - set the quantity and other attributes in the capacity_vertex_array's new entry to the values of the associated quantity and other attributes requirements of the previous vertex and replenish these values with the associated requested_quantity and other attributes requirements
else
    - if the previous vertex's quantity and other attributes equals the indexed quantity and other attributes then
        - delete the indexed vertex

RETURN

EXHIBIT B.3
TIME FRAGMENTABLE RESOURCE VERTEX INSERTION ROUTINE

This routine inserts committments for resources whose processing durations are not required to be contiguous. Labor is good example of such a resource, since work activities may span break periods.

{Assumptions;
1) That any resource value that changes relative to time will be represented by a dimension in the vertices array. The first vertex value in the vertices array will contain the boundary limit as specified in the RAD file. A list of evaluation requirements such as usage, min and max will be associated to each dimension in the vector.
2) That any resource value, static_parameter, that does not change relative to time will be a value in a parameter list associated to a particular resource id. Resource values of this type must have flag set in RAD file for each parameter value of this type.
3) That Values and Parameters are sequenced or order dependent {calling parameters}
    resource_id
    requested_start_time
    requested_stop_time
    requested_quantity and other attribute requirements
    index {returned parameters}
    insertion_status

- if time indexed in capacity_vertex_array is not equal to the requested_start_time
  - create a new entry in the capacity_vertex_array
  - set the time value for this new entry to the requested_start_time
  - set the quantity and other attributes in the capacity_vertex_array's new entry to the values of the associated quantity and other attributes requirements of the previous vertex
  - increment the index to the new entry's array position
- loop until the time indexed in capacity_vertex_array is greater than or equal to the requested_stop_time
  - if the vertex's quantity and other attributes are compatable or of a more significant magnitude then the associated requested_quantity and other attributes then
    - adjust the indexed quantity and other attributes in the capacity_vertex_array by the values of the associated requested_quantity and other attributes requirements of the previous vertex
    - if the previous vertex's quantity and other attributes equals the indexed quantity and other attributes then
      - delete the current index {index should be pointing at what was the next
                    vertex}
            else
                •increment the index
    •if time indexed in capacity_vertex_array is not equal to the
      requested_stop_time
            •create a new entry in the capacity_vertex_array
            •set the time value for this new entry to the
              requested_stop_time
            •set the quantity and other attributes in the
              capacity_vertex_array's new entry to the values of the
              associated quantity and other attributes requirements of the
              previous vertex and replenish these values with the
              associated requested_quantity and other attributes
              requirements
else
            •if the previous vertex's quantity and other attributes equals
              the indexed quantity and other attributes then
                    •delete the indexed vertex
RETURN

EXHIBIT B.4
LOGICAL EVALUATION FOR SHARABLE BUT UNINTERRUPTABLE RESOURCES VERTEX INSERTION ROUTINE

This routine inserts committments for resources that are sharable but uninterruptable during the processing activity. An example of this type of resource would be a vacuum chamber, which would lose its internal pressure if opened during the middle of a processing activity.

{Assumptions;
   1) That any resource value that changes relative to time will be represented by a dimension in the vertices array. The first vertex value in the vertices array will contain the boundary limit as specified in the RAD file. A list of evaluation requirements such as usage, min and max will be associated to each dimension in the vector.
   2) That vertices are sequenced or order dependent.
   3) Each activity will have a maximum activity duration, minimum activity duration and preferred activity duration.
   4) Each start commitment is seperated by a one second spike to represent the the start of a processing commitment. (inserted by logical_insertion routine)
   5) That this routine evaluates a nonexistent resource but a logical one that will control process starts and completion. This routine will stage the start of a process for a resource so that multiple lots can be processed concurrently even when their processing can not be interrupted. This implies a sharable but uninterruptable processing requirement.
   6) That the do not take early time and do not take after time are computed using minimum and maximum activity durations respectively. Hence activity durations can be modified without adversely effecting other commitments.
   7) That the RAD file defines the default initial buffer time for a lot to wait for other lots to increase the likelyhood of sharing resources.

8) That the calling routine sets the vertex_capacity_array index
to the vertex that is just less than or equal to
do_not_start_earlier_time {calling parameters form planning model}
    resource_id
    first_time_quantity_and_duration_available_as_requested {defined
       by successful or unsuccessful evaluation}
    starting_buffer_time {defined by successful or unsuccessful
       evaluation}
    completion_time {defined by successful evaluation}
    projected_maximum_duration {defined by successful evaluation}
    projected_minimum_duration {defined by successful evaluation}
    ending_buffer_time {defined by successful evaluation}
    index
    insertion_flag
{returned parameters}
    insertion_status

••• CHECK THE VERTICES FOR AVAILABILITY AS REQUIRED •••

• reduce completion_time, projected_maximum_duration and
  projected_minimum_duration by one for vertex spike between
  commitments
• set index to vertex just less than
  first_time_quantity_and_duration_available_as_requested
• if insertion_flag is true
    • insert a new vertex who's time element is set to
       first_time_quantity_and_duration_available_as_requested and
       starting_buffer_time is set to the passed parameter value of
       starting_buffer_time
    • insert a new vertex who's time element is set to completion
       time and minimum_duration is set to
       projected_minimum_duration and maximum_duration is set to
       projected_maximum_duration and ending_buffer_time is set to
       the passed parameter value of ending_buffer_time
    • return
• set the indexed capacity_vertex_array time element to
  first_time_quantity_and_duration_available_as_requested and set
  starting_buffer_time to the passed parameter value of
  starting_buffer_time
• increment the index
• set the indexed capacity_vertex_array time element to completion time
  and set minimum_duration to projected_minimum_duration and set
  maximum_duration to projected_maximum_duration and set
  ending_buffer_time to the passed parameter value of
  ending_buffer_time
• return

EXHIBIT B.5
CONSUMABLE RESOURCES EVALUATION
VERTEX INSERTION ROUTINE

This routine inserts processing commitments for resources that are
consumed and not normally available for use after once being used.

{Assumptions;
    1) Dates and times to indicate when new amounts of consumable type resources will become available for
consumption will be set in the RAD file.
2) That any resource value, static_parameter, that does
not change relative to time will be a value in a
parameter list associated to a particular resource id.
Resource values of this type must have flag set in RAD
file for each parameter value of this type.
3) That Values and Parameters are sequenced or order
dependent
4) That no fragmentation resources are evaluated with
this loop {calling parameters}
    resource_id
    requested_quantity
    index {returned parameters}
    insertion_status {initial returned parameters, based on success}
•set insertion_status to success

•set axis_offset_value from resource parameters list to
    axis_offset_value plus requested_quantity
•RETURN

I claim:
1. A process for altering the physical state of predetermined input materials by allocating one or more resources to meet one or more predetermined demands on the resources, comprising:
   providing predetermined input materials having a physical state it is desired to alter;
   identifying a plurality of demands for altering the physical state of the predetermined input materials;
   providing a plurality of physical resources needed to perform the desired alteration of the physical state of the predetermined input materials;
   converting the demands into an array of physical resource capacity requirements for each resource which is ordered in time and has entries only for time values when the required capacities change;
   providing for each resource an array of available capacities which is ordered in time and has entries only for time values when the available capacities change;
   comparing the time ordered arrays of required and available capacities to determine whether and when the available capacities equal or exceed the required capacities and, when successful, modifying the time ordered array of available capacities to provide an up-dated time ordered array of available capacities reflecting the assignment of available capacities to meet the requirements associated with the demands, wherein the up-dated time ordered array of available capacities only has entries when the up-dated available capacities change; and
   applying the resource required first in time to the input materials to change the physical state thereof.
2. A process of altering the physical state of predetermined input materials to meet a predetermined production or service demand, including steps for allocating resources, said process comprising:
   providing predetermined input materials having a physical state it is desired to alter;
   identifying a plurality of demands for altering the physical state of the predetermined input materials and selecting a first demand q from the plurality of demands;
   identifying one or more quantifiable physical requirements r associated with the $q^{th}$ physical demand, relevant to altering the physical state of the input materials;
   providing a plurality of physical resources needed to perform the desired alteration of the physical state of the predetermined input materials;
   selecting a $p^{th}$ physical resource from the plurality of resources and identifying one or more quantifiable physical constraints c associated with the $p^{th}$ physical resource, relevant to altering the physical state of the predetermined input materials;
   providing an orderable array of multidimensional demand vertices $D_q$ for the demand q, wherein t is time, r identifies the physical requirements associated with the $q^{th}$ demand, and j is an integer index running from 1 to j wherein j is the total number of times wherein r has differing values;
   ordering the array of multidimensional vertices $D_q$ for increasing values of t, wherein each value of j corresponds to a value of t where r changes value;
   storing the ordered values of $D_q$ corresponding to each value of j;
   providing an orderable array of multidimensional resource vertices $R_p$ for the resource p, wherein t is time, c identifies the physical constraints associated with the $p^{th}$ resource, and i is an integer index run- ning from 1 to I wherein I is the total number of times wherein c has differing values;

ordering the array of multidimensional vertices $R_p$ for increasing values of t, wherein each value of i corresponds to a value of t where c changes value;

storing the ordered values of $R_p$ corresponding to each value of i;

comparing $R_p$ and $D_q$ to determine the values i' and i" of i between which $c >/= r, t(i') </= t(j=1)$ and $t(i") >/= t(j=2)$, and decrementing the values of c in $R_p$ for $i=(i'=1)$ to $(i"+1)$ to $(i"-1)$ by $r(j=1)$, and if $t(i') = t(j=1)$, replacing c in the value of $R_p$ by $c = c(i') - r(j=1)$, or if $t(i') < t(j=1)$, inserting a first new value $R+_p$ in the ordered array of vertices $R_p$ at $t(i') < t </= t(j=1)$, wherein the first newly inserted value $R+_p$ has $c = c(i') - r(j=1)$, and if $t(i") = t(j=2)$, leaving the value of $R_p$ unaltered, or if $t(i") > t(j=2)$, inserting a further new value $R++_p$ in the ordered array of vertices $R_p$ at $t(j=2) </= t < t(i") >$, wherein the further newly inserted value $R++_p$ has $c = c(i"-1) + r(j=1)$, and increasing I by the number of newly inserted values of $R_p$; and changing the physical state of the input material by applying the $p^{th}$ resource to the input material of the $q^{th}$ demand at a beginning time $t_b$ of $t(i') </=- t_b </= t(j=1)$ until an ending time $t_e$ of $t(j=2) </= t_e </= t(i")$.

3. The process of claim 2 wherein the described process is repeated for each resource p and demand q until a series of beginning and ending times is obtained for completing the entire desired manufacturing or service sequence on all of the needed resources.

4. The process of claim 2 further comprising providing an updated ordered array of resource vertices $R_p$ incorporating the newly accommodate demand.

5. The process of claim 2 wherein the comparing step is modified to determine the first available values i* and i** and corresponding times t(i*) and t(i**) when $c >/= r$ for a time interval $dt = t(j=2) - t(j=1)$, and then setting $t(j=1) = t(i*)$ and $t(j=2) = t(i*) + dt$.

6. The process of claim 2 wherein the comparing step is modified to determine the first available combination of a predetermined number of i value pairs $i_a, i_b; i_c, i_d; \ldots i_n, i_m$ corresponding to time intervals $dt_1, dt_2, \ldots dt_n$, wherein $dt_1 + dt_2 + \ldots dt_n >/= dt$.

7. The process of claim 2 including performing with a computer the steps of "ordering the array of multidimensional vertices $D_q$", "ordering the array of multidimensional vertices $R_q$" and "comparing $R_p$ and $D_q$".

* * * * *